United States Patent
Lin (10) Patent No.: US 11,612,237 B2
(45) Date of Patent: Mar. 28, 2023

(54) LIFTING DEVICE WITH CABLE MANAGEMENT COMPONENT

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 113 days.

(21) Appl. No.: 17/196,227

(22) Filed: Mar. 9, 2021

(65) Prior Publication Data

US 2022/0232967 A1 Jul. 28, 2022

(30) Foreign Application Priority Data

Jan. 25, 2021 (TW) .................................. 110200924

(51) Int. Cl.
- *A47B 9/04* (2006.01)
- *A47C 3/24* (2006.01)
- *A47B 21/06* (2006.01)
- *H02G 11/00* (2006.01)

(52) U.S. Cl.
CPC ................ *A47B 9/04* (2013.01); *A47B 21/06* (2013.01); *A47C 3/24* (2013.01); *H02G 11/00* (2013.01); *A47B 2200/0056* (2013.01)

(58) Field of Classification Search
CPC ... A47B 9/04; A47B 21/06; A47B 2200/0056; A47C 3/24; H02G 11/00; H02G 11/003
See application file for complete search history.

(56) References Cited

U.S. PATENT DOCUMENTS

| 9,723,920 B1* | 8/2017 | Wu | H02K 7/06 |
| 2002/0162410 A1* | 11/2002 | Zimmerman | F16H 25/20 |
| | | | 74/89.35 |
| 2013/0015300 A1* | 1/2013 | Klinke | A47B 9/20 |
| | | | 248/49 |
| 2020/0214439 A1* | 7/2020 | Bennett | A47B 9/20 |

* cited by examiner

*Primary Examiner* — Terrell L McKinnon
*Assistant Examiner* — Jerry Nmn Olivier
(74) *Attorney, Agent, or Firm* — Chun-Ming Shih; HDLS IPR Services (57) ABSTRACT

A lifting device with a cable management is provided. The lifting device includes: an outer pipe, an actuation mechanism, a linkage member, a cable, and a cable management component. The actuation mechanism is accommodated in the outer pipe and has a motor and a screw rod. The linkage member is accommodated in the outer pipe and mutually screw-fitted with the screw rod to operate, and moves relative to the outer pipe. The cable has a spiral coiled cable unit. A shaft core line in parallel with the screw rod is defined by the spiral coiled cable unit. The cable management component is disposed in the outer pipe and in parallel to the shaft core line. The spiral coiled cable unit is reeled on the cable management component. Accordingly, the cable may be stably positioned and the cable may be prevented from rubbing or being tangled with the screw rod.

11 Claims, 10 Drawing Sheets

LIFTING DEVICE WITH CABLE MANAGEMENT COMPONENT

BACKGROUND OF THE DISCLOSURE

Field of the Disclosure

This disclosure relates to a lifting device installed in a table or a chair and capable of driving the table or the chair to ascend or descend, especially to a lifting device with a cable management component.

Description of Related Art

A related-art lifting device used for enabling a table or a chair to ascend or descend is provided with a motor as a power source, and a screw rod is provided for transmission, so that a connecting end fastened on the table or the chair is able to perform a linear movement for allowing a height of the table or the chair to be adjusted via the connecting end of the lifting device, thereby satisfying requirements of the consumers.

However, cables, for example a power cable or a signal transmitting cable, connected to an external controller are disposed in the lifting device, because an internal space of the lifting device is limited or the cable may have to be moved with a connecting end, the cable is not easy to be stably positioned and may rub or be tangled with the screw rod. Thus, the cable may be damaged or the lifting device may not be able to operate.

Accordingly, the applicant of this disclosure has devoted himself for improving the mentioned disadvantages.

SUMMARY OF THE DISCLOSURE

This disclosure is to provide a lifting device with a cable management component, in which a spiral coiled cable unit is reeled on a cable management component, so that the cable may be stably positioned and prevented from rubbing or being tangled with a screw rod. Therefore, the lifting device is provided with advantages of having an excellent service life and a prettified appearance.

Accordingly, this disclosure provides a lifting device with a cable management component including: an outer pipe; an actuation mechanism, accommodated in the outer pipe, and having a motor and a screw rod driven by the motor to rotate; a linkage member, accommodated in the outer pipe, and mutually screw-fitted with the screw rod to operate to ascend or descend relative to the outer pipe; a cable, connected to the outer pipe and one end thereof fastened to the linkage member to move with the linkage member, the cable having a spiral coiled cable unit, a shaft core line being defined by the spiral coiled cable unit, and the shaft core line being arranged to be in parallel with the screw rod; and a cable management component, disposed in the outer pipe and in parallel with the shaft core line, the spiral coiled cable unit being reeled on the cable management component.

Based on what has been disclosed above, the spiral coiled cable unit is provided with an elastic deformation, so that the spiral coiled cable unit is able to be retracted or prolonged when the cable moves with the linkage member. The cable management component is arranged to be in parallel to the shaft core line of the spiral coiled cable unit, the spiral coiled cable unit is reeled on the cable management component, so that the spiral coiled cable unit is restrained by the cable management component for being kept in a vertical status during the process of being retracted or prolonged. Therefore, the spiral coiled cable unit is prevented from being twisted or tangled. The spiral coiled cable unit may be stably positioned, and the functions of requiring no additional mechanism to isolate the cable, preventing the spiral coiled cable unit from rubbing or being tangled with the screw rod, hiding the cable in the outer pipe may be achieved. The lifting device may be provided with advantages of having an excellent service life and a prettified appearance.

DETAILED DESCRIPTION OF THE DISCLOSURE

Embodiments of this disclosure are described with reference to the drawings.

Figure 1:
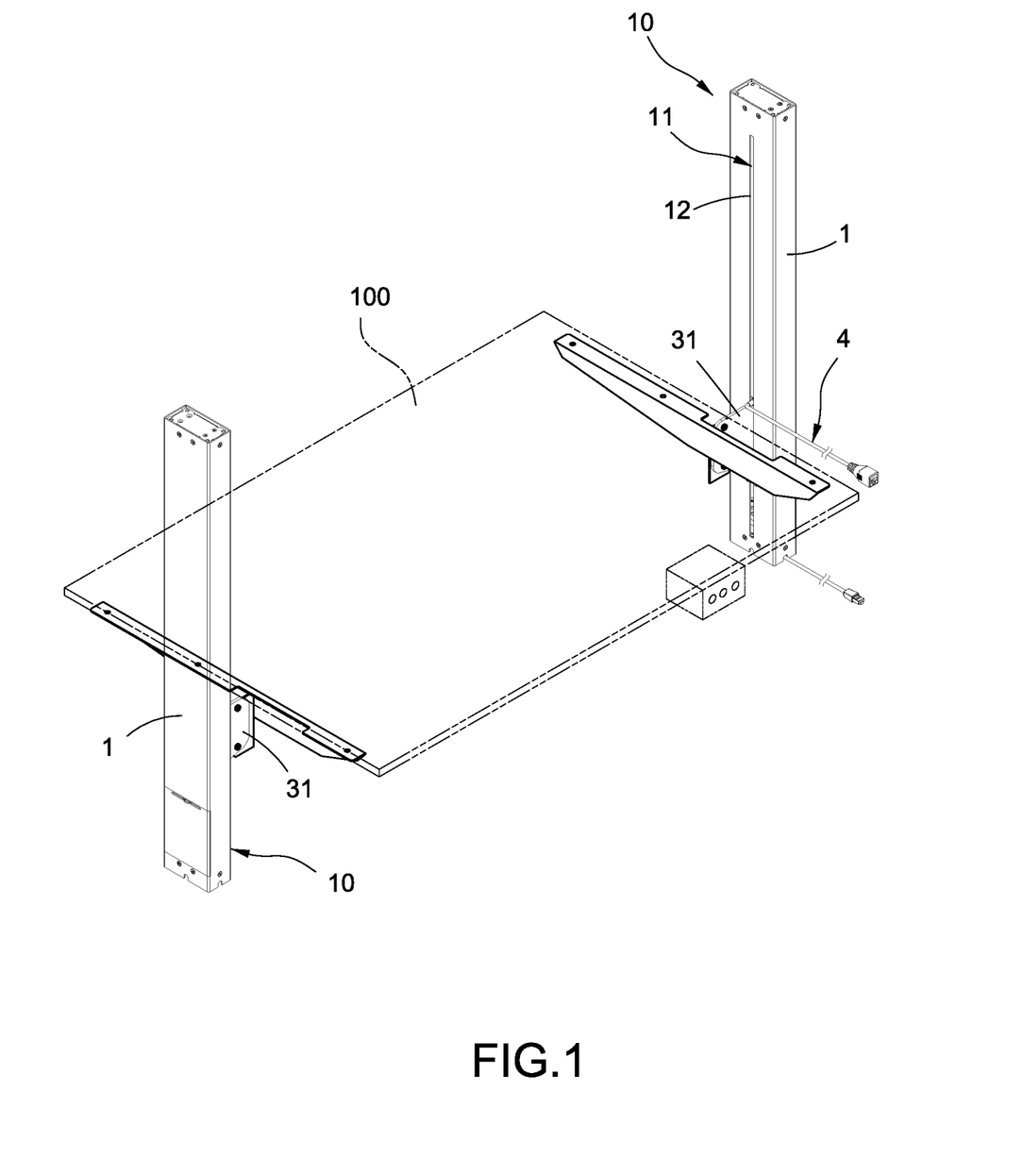
FIG. 1 is a schematic view showing an operating status of a lifting device according to this disclosure.
Figure 2:
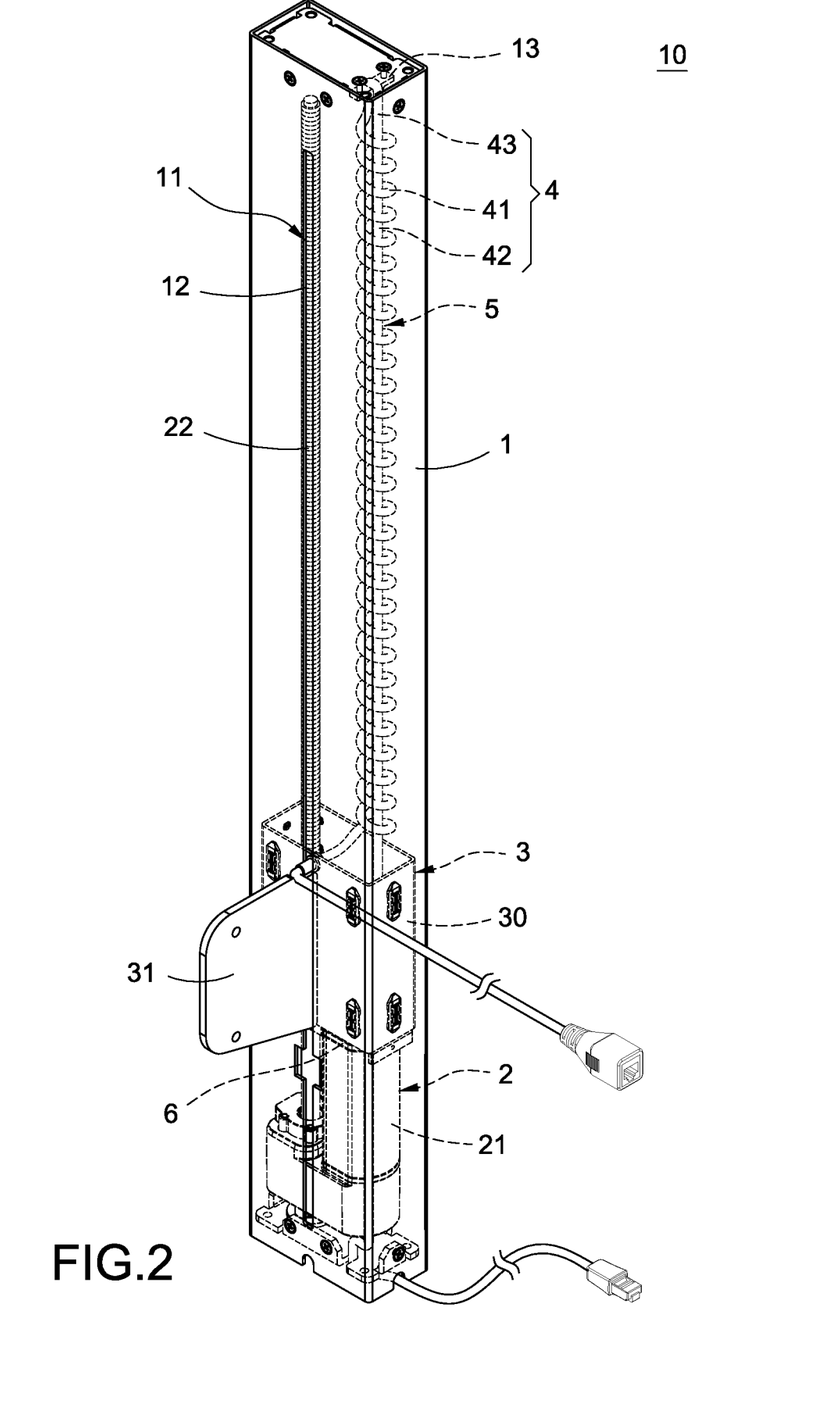
FIG. 2 is a perspective view showing the assembly of the lifting device according to this disclosure.
Figure 3:
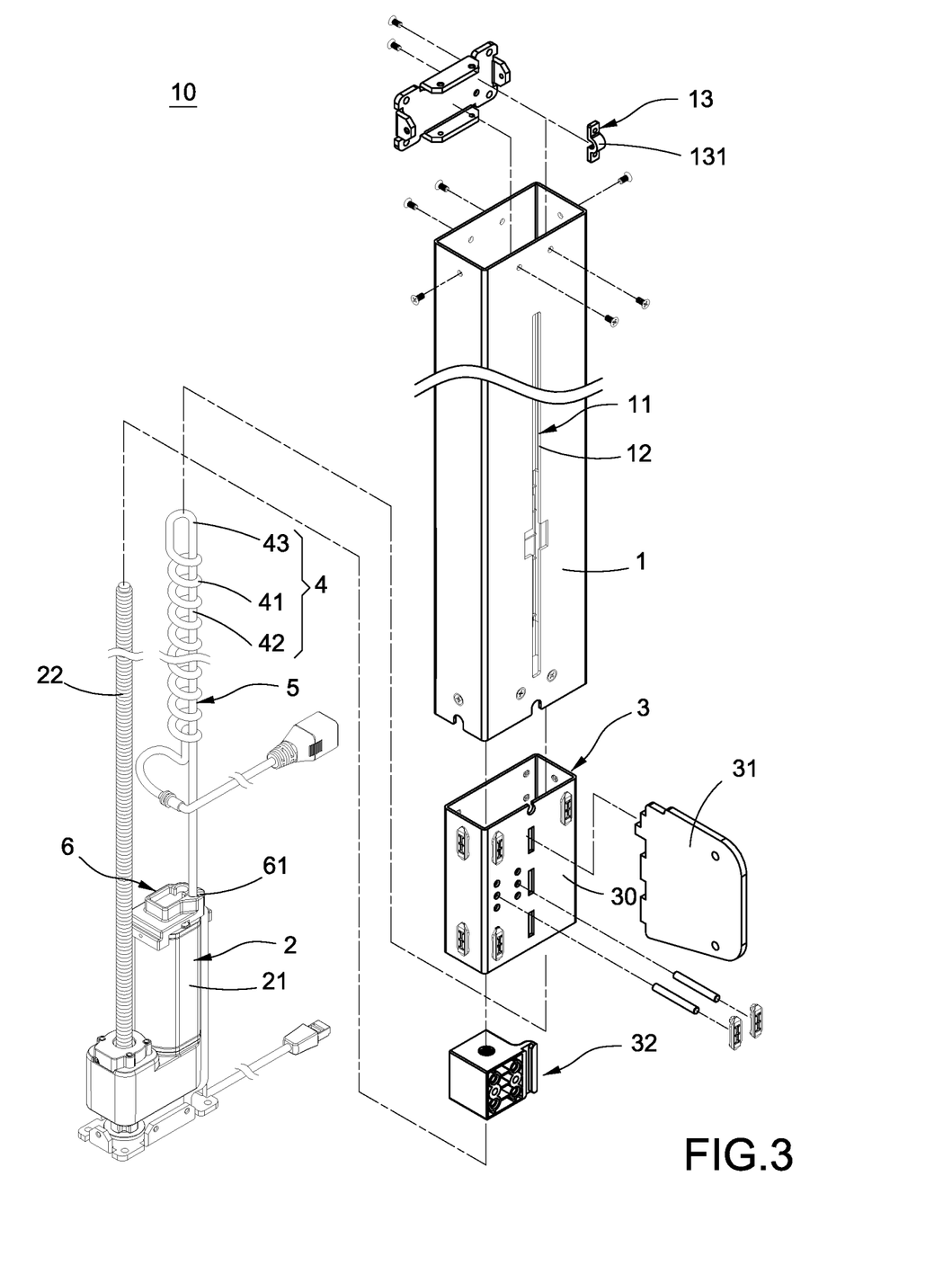
FIG. 3 is a perspective exploded view showing the lifting device according to this disclosure.
Figure 4:
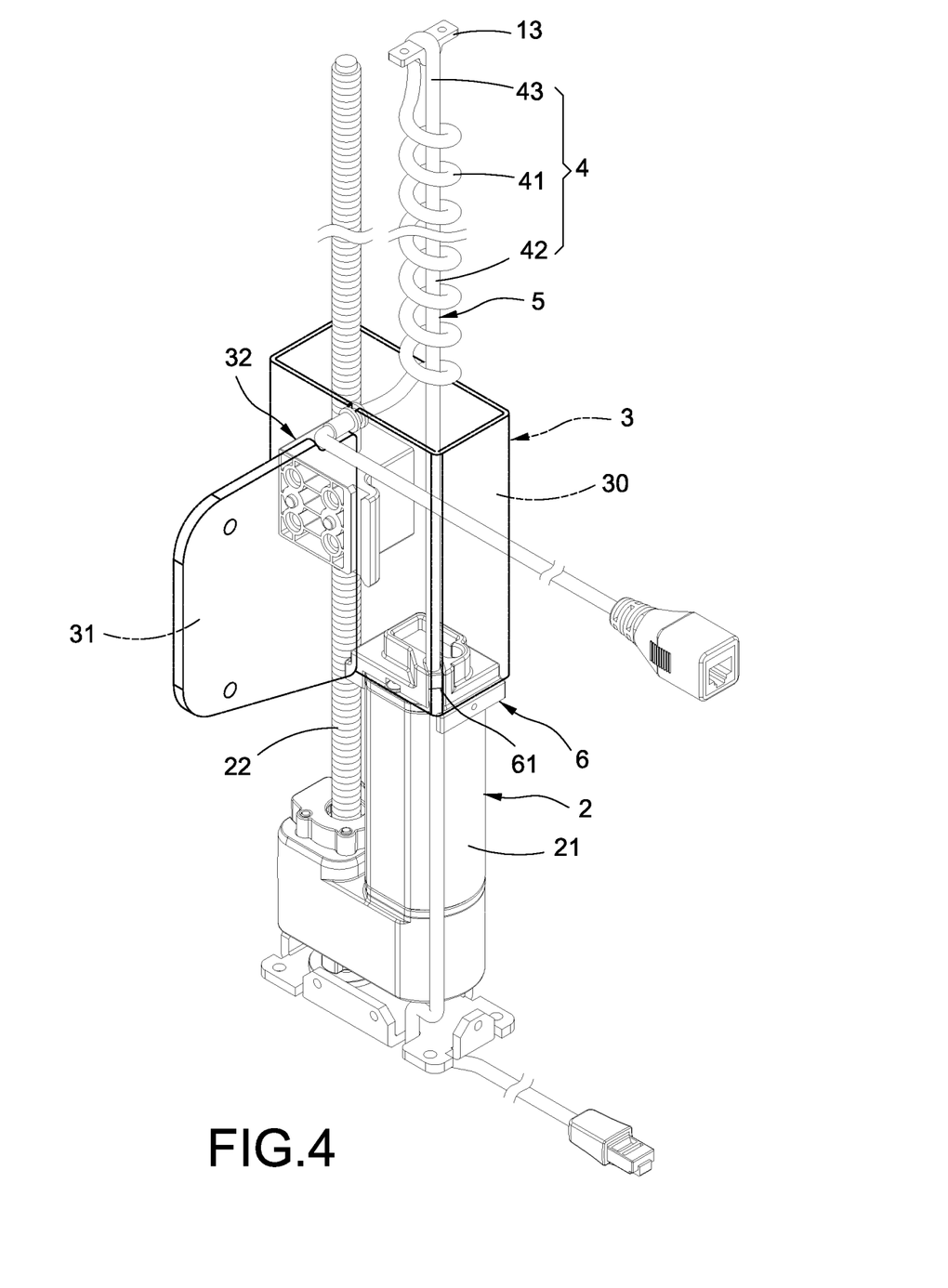
FIG. 4 is a partial perspective view showing the assembly of the lifting device according to this disclosure.
Figure 5:
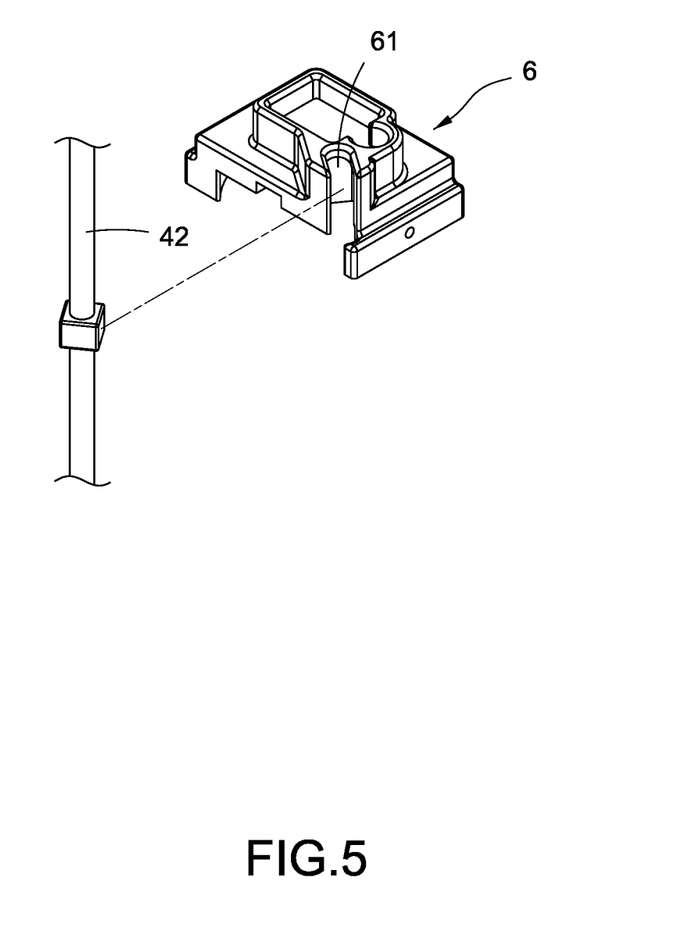
FIG. 5 is a partial perspective exploded view showing the lifting device according to this disclosure.
Figure 6:
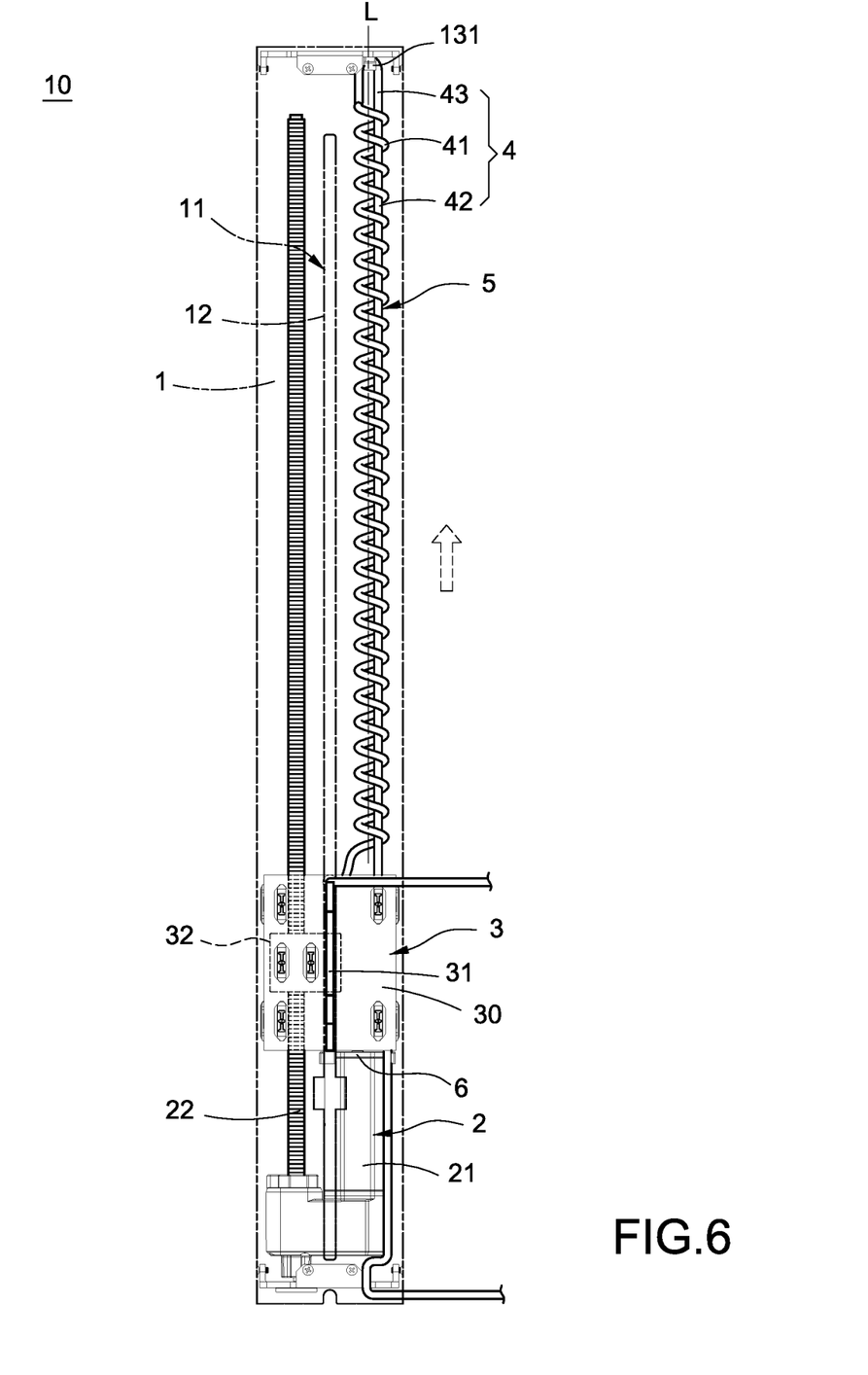
FIG. 6 is another perspective view showing the assembly of the lifting device according to this disclosure.

Please refer to FIG. 1 and FIG. 6, this disclosure provides a lifting device having a cable management component. The lifting device 10 includes an outer pipe 1, an actuation mechanism 2, a linkage member 3, a cable 4 and a cable management component 5.

As shown from FIG. 1 to FIG. 3 and FIG. 6, the outer pipe 1 is formed with a groove 11, and a latch member 13 is disposed on a top inner wall of the outer pipe 1. According to this embodiment, the groove 11 is a linear slot 12, but what shall be addressed is that the scope of this disclosure is not limited to the linear slot 12.

As shown from FIG. 2 to FIG. 4 and FIG. 6, the actuation mechanism 2 is accommodated in the outer pipe 1, and the actuation mechanism 2 includes a motor 21 and a screw rod 22 driven by the motor 21 to rotate. According to this embodiment, the linear slot 12 and the screw rod 22 are arranged to be in parallel, but what shall be addressed is that the scope of this disclosure is not limited to the above-mentioned arrangement.

As shown from FIG. 1 to FIG. 4 and FIG. 6, the linkage member 3 is accommodated in the outer pipe 1, and the linkage member 3 is mutually screwed-fitted with the screw rod 22 for transmissions and the linkage member 3 passes through the groove 11, thereby the linkage member 3 may ascend or descend relative to the outer pipe 1.

Details are provided as below. According to this embodiment, the linkage member 3 includes a hollow inner pipe 30 and a screw nut 32. The screw nut 32 is fastened to the hollow inner pipe 30 and mutually screwed-fitted with the screw rod 22 for transmissions, the hollow inner pipe 30 is extended with a protruding piece 31. The protruding piece 31 passes through the linear slot 12. When the linkage member 3 and the screw rod 22 are mutually screwed-fitted for transmissions, the linkage member 3 is able to ascend or descend relative to the outer pipe 1, and the protruding piece 31 is driven to slide along the linear slot 12.

As shown from FIG. 1 to FIG. 6, the cable 4 is connected to the outer pipe 1 and one end of the cable 4 is fastened to the linkage member 3 to move with the linkage member 3. The cable 4 includes a positioning segment 43 latched to the latch member 13. The cable 4 further includes a spiral coiled cable unit 41 and a linear cable unit 42 respectively extended from two ends of the positioning segment 43. A shaft core line L is defined by the spiral coiled cable unit 41. The shaft core line L is arranged in parallel with the screw rod 22. According to this embodiment, an appearance of the positioning segment 43 is formed in a reversed-U shape, but what shall be addressed is that the scope of this disclosure is not limited to the above-mentioned arrangement.

According to this embodiment, one end of the spiral coiled cable unit 41 is connected to the outer pipe 1 and another end of the spiral coiled cable unit 41 is fastened with the linkage member 3 to move with the linkage member 3. Details are provided as below. One end of the spiral coiled cable unit 41 is extended from the positioning segment 43 and connected to the latched member 13 of the outer pipe 1. Another end of the spiral coiled cable unit 41 is fastened to the hollow inner pipe 30 of the linkage member 3 and moves with the hollow inner pipe 30 of the linkage member 3. The linear cable unit 42 is disposed in the hollow inner pipe 30 and does not move with the hollow inner pipe 30. The distal ends of the spiral coiled cable unit 41 and the linear cable unit 42 are exposed from the outer pipe 1 to connect with a manual controller and an external control box (not shown in figures).

Moreover, according to this embodiment, the latch member 13 is a latch block 131, but what shall be addressed is that the scope of this disclosure is not limited to the above-mentioned arrangement. The positioning segment 43 is latched to the latch block 131 and positioned by the latch block 131.

As shown from FIG. 2 to FIG. 4 and FIG. 6, the cable management component 5 is disposed in the outer pipe 1 and arranged to be in parallel with the shaft core line L, and the spiral coiled cable unit 41 is reeled on the cable management component 5.

Details are provided as below, the cable management component 5 is the linear cable unit 42 extended from the cable 4 and parallel to the shaft core line L, and the spiral coiled cable unit 41 is disposed and reeled on an outer side of the linear cable unit 42.

As shown from FIG. 2 to FIG. 6, the lifting device 10 of this disclosure further includes a stopping seat 6. The stopping seat 6 is disposed between the motor 21 and the hollow inner pipe 30 and used for stopping the hollow inner pipe 30, so that the hollow inner pipe 30 may be prevented from colliding with the motor 21 while ascending or descending. The stopping seat 6 is formed with a through hole 61. One end of the linear cable unit 42 away from the positioning segment 43 passes through the through hole 61.

As shown in FIG. 1 and FIG. 6, which show an operating status of the lifting device 10 of this disclosure. The protruding pieces 31 of the plurality of lifting devices 10 are fixed and connected to a table plate 100. When the screw rod 22 is driven by the motor 21 to forwardly or reversely rotate, the linkage member 3 is driven to ascend or descend relative to the outer pipe 1, and the protruding piece 31 drives the table plate 100 to ascend or descend relative to the outer pipe 1. Therefore, a function of automatically adjusting a height of the table plate 100 may be achieved.

Moreover, the spiral coiled cable unit 41 may be provided with an elastic deformation, so that the spiral coiled cable unit 41 may be retracted when the linkage member 3 ascends, and the spiral coiled cable unit 41 may be prolonged when the linkage member 3 descends. In other words, the spiral coiled cable unit 41 may be retracted or prolonged when the cable 4 moves with the linkage member 3. Thus, by arranging the linear cable unit 42 and the shaft core line L of the spiral coiled cable unit 41 to be in parallel and disposing and reeling the spiral coiled cable unit 41 on the outer side of the linear cable unit 42, the spiral coiled cable unit 41 is restrained by the linear cable unit 42 for being kept in a vertical status during the process of being retracted or prolonged. Therefore, the spiral coiled cable unit 41 is prevented from being twisted or tangled, the spiral coiled cable unit 41 may be stably positioned, and the functions of requiring no additional mechanism to isolate the cable 4, preventing the spiral coiled cable unit 41 from rubbing or being tangled with the screw rod 22, hiding the cable 4 in the outer pipe 1 may be achieved. The lifting device 10 may be provided with advantages of having an excellent service life and a prettified appearance.

Figure 7:
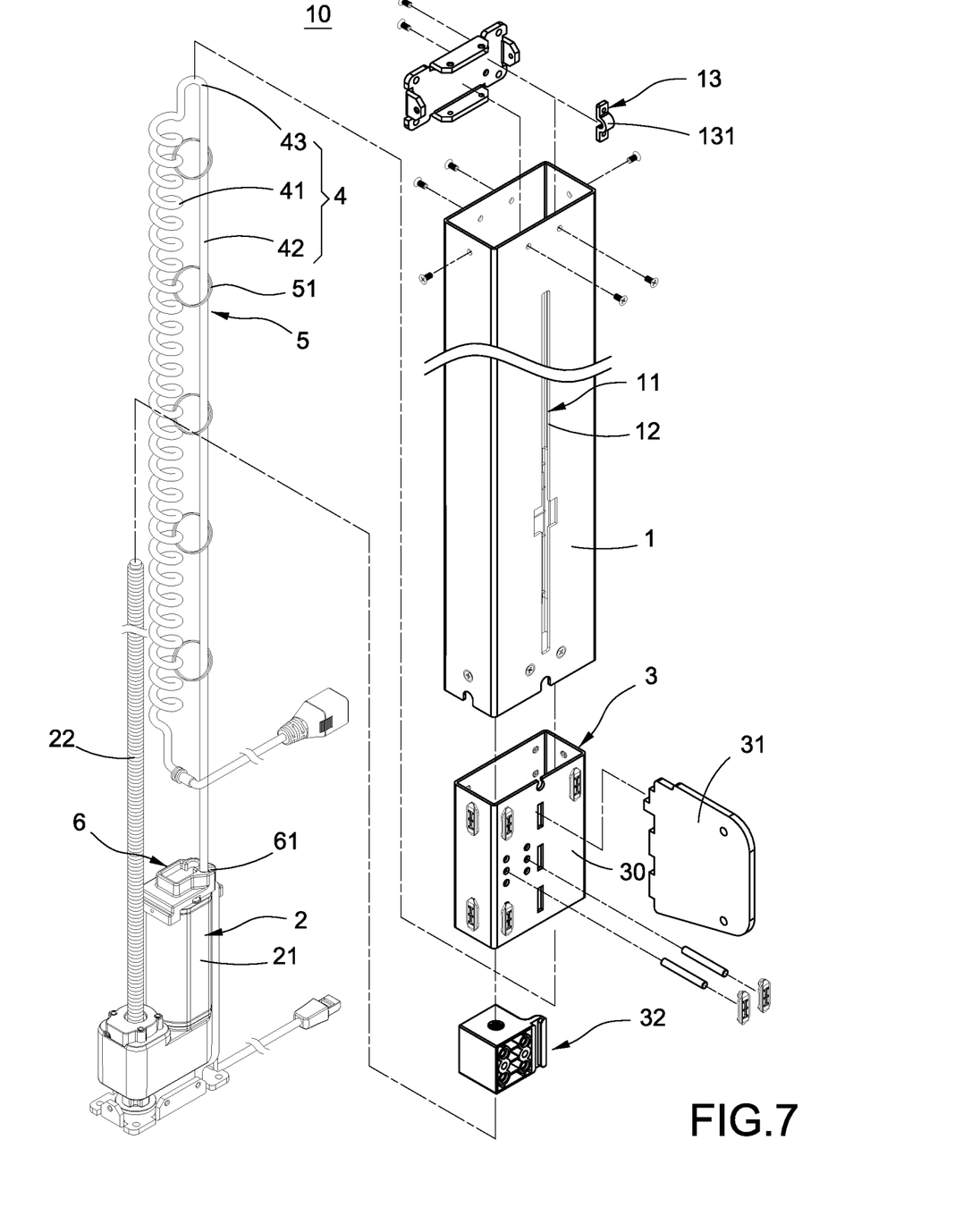
FIG. 7 is a perspective exploded view showing the lifting device according to another embodiment of this disclosure.
Figure 8:
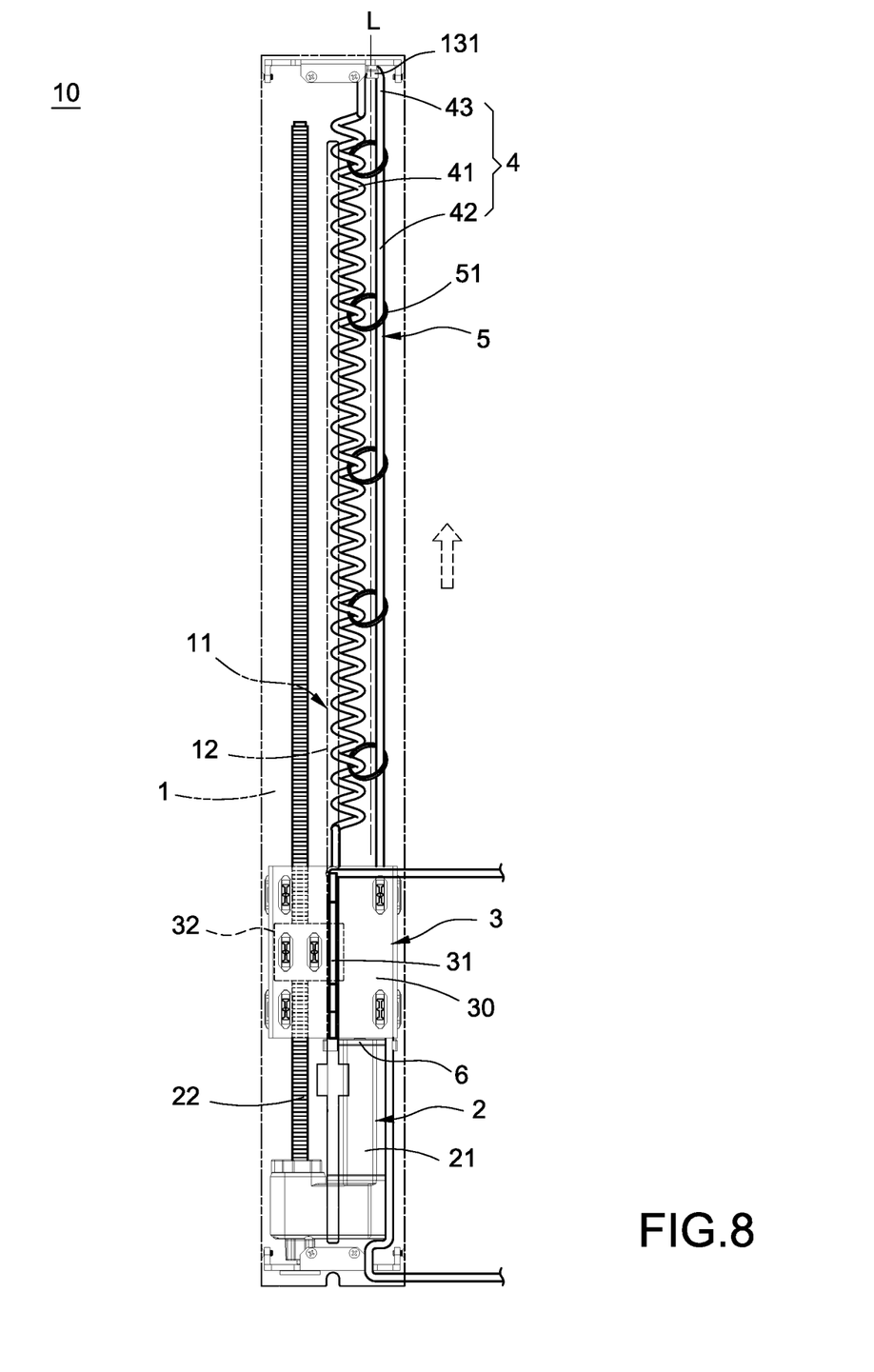
FIG. 8 is a perspective view showing the assembly of the lifting device according to the another embodiment of this disclosure.

Please refer to FIG. 7 and FIG. 8, which disclose another embodiment of the lifting device 10 according to this disclosure. The embodiment disclosed in the FIG. 7 and FIG. 8 and the embodiment disclosed from FIG. 1 to FIG. 6 are substantially the same. The difference between the embodiment disclosed in the FIG. 7 and FIG. 8 and the embodiment disclosed from FIG. 1 to FIG. 6 is the structure of the cable management component 5. According to this embodiment, the spiral coiled cable unit 41 is not disposed and reeled on the outer side of the linear cable unit 42.

According to this embodiment, one end of the spiral coiled cable unit 41 is connected to the outer pipe 1 and another end of the spiral coiled cable unit 41 is fastened to the linkage member 3 to move with the linkage member 3. Details are provided as below. The cable management component 5 includes the linear cable unit 42 extended from the cable 4 and in parallel to the shaft core line L and a plurality of fastening ring 51 sleeved on the spiral coiled cable unit 41 and the linear cable unit 42, so that one side of each of the fastening rings 51 is sleeved on the spiral coiled cable unit 41 and another side of each of the fastening rings 51 is sleeved on the linear cable unit 42.

Accordingly, the plurality of fastening rings 51 may be driven to move on the linear cable unit 42 during the process of the spiral coiled cable unit 41 being retracted or prolonged, and the spiral coiled cable unit 41 is restrained by the plurality of fastening rings 51, and the plurality of fastening rings 51 are restrained by the linear cable unit 42 for being kept in a vertical status. Therefore, the spiral coiled cable unit 41 is prevented from being twisted or tangled, and the same functions and effects provided by the embodiment in FIG. 1 to FIG. 6 may also be achieved.

Figure 9:
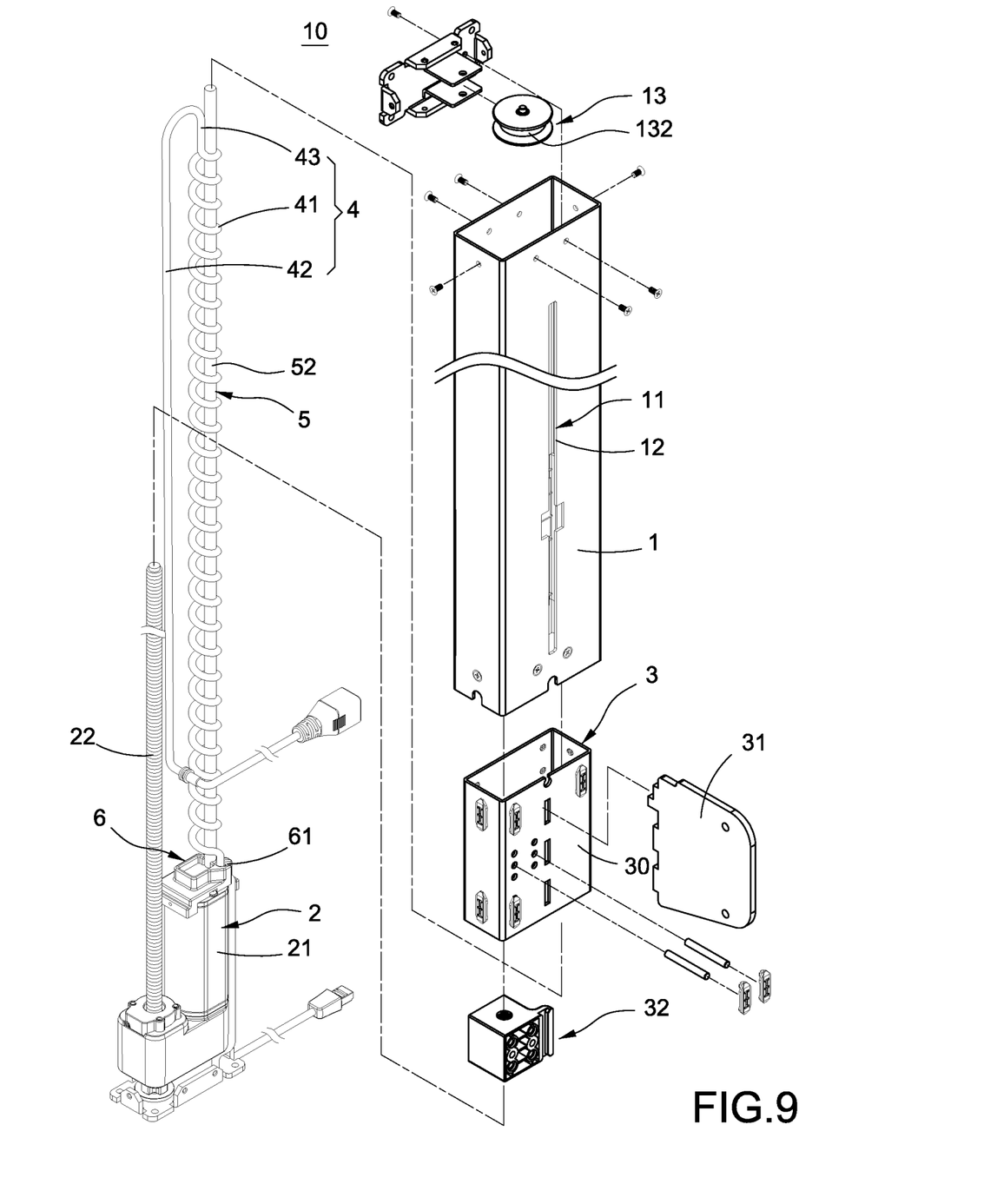
FIG. 9 is a perspective exploded view showing the lifting device according to one another embodiment of this disclosure.
Figure 10:
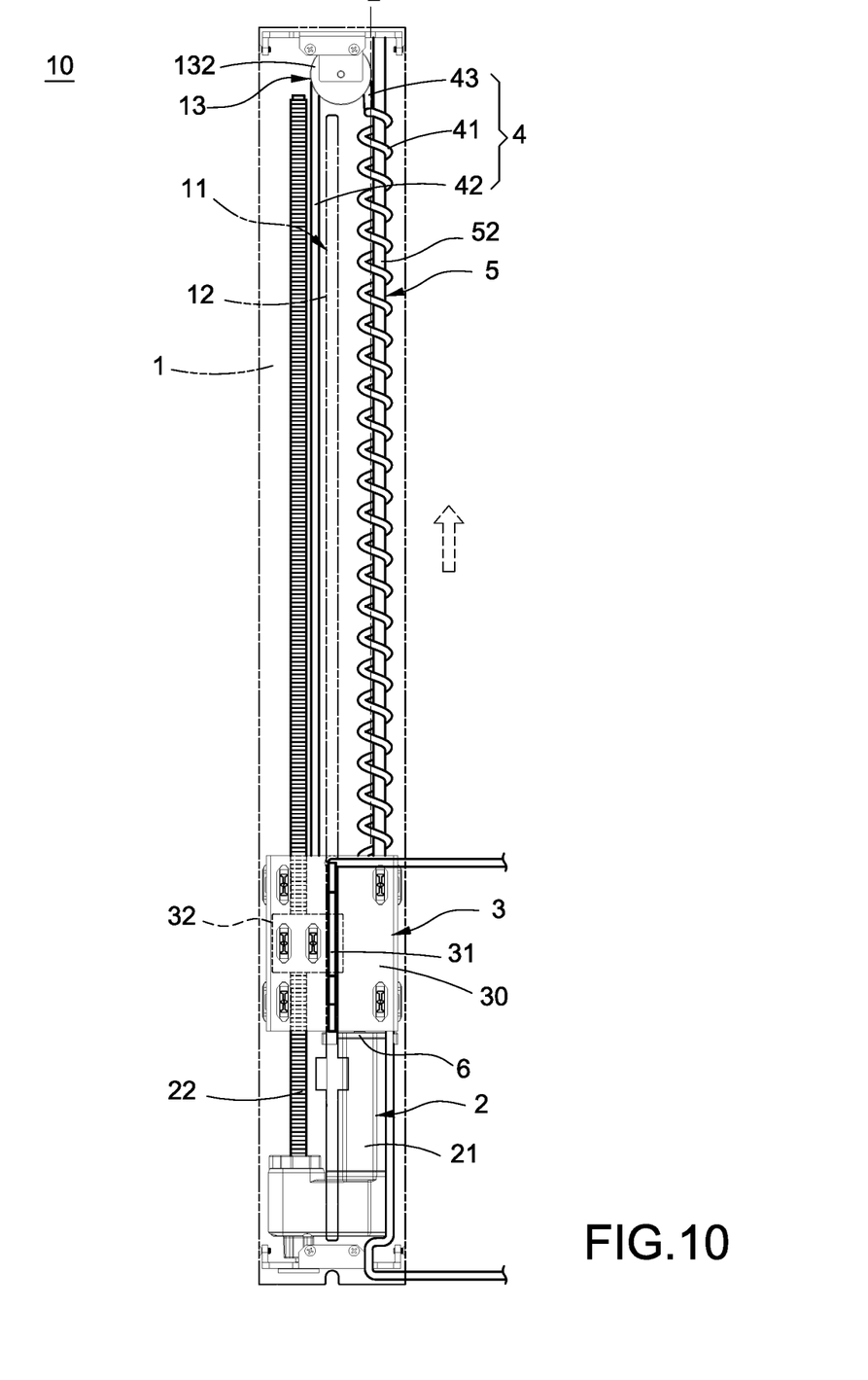
FIG. 10 is a perspective view showing the assembly of the lifting device according to the one another embodiment of this disclosure.

Please refer to FIG. 9 and FIG. 10, which disclose one another embodiment of the lifting device 10 according to this disclosure. The embodiment disclosed in the FIG. 9 and FIG. 10 and the embodiment disclosed from FIG. 1 to FIG. 6 are substantially the same. The difference between the embodiment disclosed in the FIG. 9 and FIG. 10 and the embodiment disclosed from FIG. 1 to FIG. 6 is the structure of the cable management component 5. According to this embodiment, the spiral coiled cable unit 41 is not disposed and reeled on the outer side of the linear cable unit 42.

In addition, the difference between the embodiment disclosed in the FIG. 9 and FIG. 10 and the embodiment disclosed from FIG. 1 to FIG. 6 is that: according to this embodiment, one end of the linear cable unit 42 is connected to the outer pipe 1 and another end of the linear cable unit 42 is fastened to the linkage member 3 to move with the linkage member 3. Details are provided as below. One end of the linear cable unit 42 is extended from the positioning segment 43 and connected to the latch member 13 of the outer pipe 1, another end of the linear cable unit 42 is fastened to the hollow inner pipe 30 of the linkage member 3 and moves with the hollow inner pipe 30 of the linkage member 3. The spiral coiled cable unit 41 passes through the hollow inner pipe 30 and does not move with the hollow inner pipe 30. One end of the spiral coiled cable unit 41 away from the positioning segment 43 passes through the through hole 61 of the stopping seat 6.

Moreover, the cable management component 5 is a positioning shaft 52 accommodated in the outer pipe 1 and in parallel to the shaft core line L. The spiral coiled cable unit 41 is disposed and reeled on an outer side of the positioning shaft 52. The positioning shaft 52 passes through the hollow inner pipe 30 and does not move with the hollow inner pipe 30.

According to this embodiment, the latch member 13 is a roller 132, the positioning segment 43 is latched to the roller 132 and slidable relative to the roller 132. When the linear cable unit 42 ascends with the linkage member 3, the positioning member 43 slides towards the spiral coiled cable unit 41 through the roller 132 and the spiral coiled cable unit 41 is released, thereby the spiral coiled cable unit 41 is retracted. When the linear cable unit 42 descends with the linkage member 3, the positioning segment 43 slides away from the spiral coiled cable unit 41 through the roller 132 and the spiral coiled cable unit 41 is tightened, thereby the spiral coiled cable unit 41 is prolonged. In other words, the spiral coiled cable unit 41 is retracted or prolonged while the cable 4 moves with the linkage member 3.

Accordingly, the spiral coiled cable unit 41 may be restrained by the positioning shaft 52 for being kept in a vertical status during the process of the spiral coiled cable unit 41 being retracted or prolonged. Therefore, the spiral coiled cable unit 41 is prevented from being twisted or tangled, and the same functions and effects provided by the embodiment in FIG. 1 to FIG. 6 may also be achieved.

Based on what has been disclosed above, the lifting device having the cable management component is novel and more practical in use comparing to related arts.

Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of the disclosure as defined in the appended claims.

What is claimed is:
1. A lifting device with a cable management component, the lifting device comprising:
    an outer pipe;
    an actuation mechanism, accommodated in the outer pipe, and comprising a motor and a screw rod driven by the motor to rotate;
    a linkage member, accommodated in the outer pipe, and mutually screw-fitted with the screw rod to operate, and ascending or descending relative to the outer pipe;
    a cable, connected to the outer pipe and one end thereof fastened to the linkage member to move with the linkage member, wherein the cable comprises a spiral coiled cable unit, a shaft core line is defined by the spiral coiled cable unit, and the shaft core line is arranged to be in parallel with the screw rod; and
    a cable management component, disposed in the outer pipe and in parallel with the shaft core line, wherein the spiral coiled cable unit is reeled on the cable management component,
    wherein the outer pipe comprises a groove in a manner of a linear slot and in parallel to the screw rod, the linkage member comprises a hollow inner pipe, the hollow inner pipe comprises a protruding piece extended therefrom and disposed in the linear slot, and the protruding piece is slidable along the linear slot.

2. The lifting device with the cable management component according to claim 1, wherein one end of the spiral coiled cable unit is connected to the outer pipe and another end of the spiral coiled cable unit is fastened to the linkage member to move with the linkage member, the cable management component comprises a linear cable unit extended from the cable and in parallel to the shaft core line, and the spiral coiled cable unit is disposed and reeled on an outer side of the linear cable unit.

3. The lifting device with the cable management component according to claim 2, wherein the linkage member comprises a hollow inner pipe and a screw nut, the screw nut is fastened to the hollow inner pipe and mutually screw-fitted with the screw rod to operate, the spiral coiled cable unit is fastened to the hollow inner pipe and moves with the hollow inner pipe, the linear cable unit is disposed in the hollow inner pipe, a latch member is disposed on a top inner wall of the outer pipe, the cable comprises a positioning segment latched to the latch member, the spiral coiled cable unit and the linear cable unit are extended from two ends of the positioning segment, and the latch member comprises a latch block.

4. The lifting device with the cable management component according to claim 3, further comprising: a stopping seat, disposed between the motor and the hollow inner pipe to stop the hollow inner pipe, the stopping seat comprising a through hole, and one end of the linear cable unit away from the positioning segment being disposed in the through hole.

5. The lifting device with the cable management component according to claim 1, wherein one end of the spiral coiled cable unit is connected to the outer pipe and another end of the spiral coiled cable unit is fastened to the linkage member and moves with the linkage member, the cable management component comprises a linear cable unit extended from the cable and in parallel to the shaft core line and a plurality of fastening rings sleeved on the spiral coiled cable unit and the linear cable unit.

6. The lifting device with the cable management component according to claim 5, wherein the linkage member comprises a hollow inner pipe and a screw nut, the screw nut is fastened to the hollow inner pipe and mutually screw-fitted with the screw rod to operate, the spiral coiled cable unit is fastened to the hollow inner pipe and moves with the hollow inner pipe, the linear cable unit is disposed in the hollow inner pipe, a latch member is disposed on a top inner wall of the outer pipe, the cable comprises a positioning segment latched to the latch member, the spiral coiled cable unit and the linear cable unit are extended from two ends of the positioning segment, and the latch member comprises a latch block.

7. The lifting device with the cable management component according to claim 6, further comprising: a stopping seat, disposed between the motor and the hollow inner pipe to stop the hollow inner pipe, the stopping seat comprising a through hole, and one end of the linear cable unit away from the positioning segment passing through the through hole.

8. The lifting device with the cable management component according to claim 1, wherein the cable management component comprises a positioning shaft accommodated in the outer pipe and in parallel to the shaft core line, and the spiral coiled cable unit is disposed and reeled on an outer side of the positioning shaft.

9. The lifting device with the cable management component according to claim 8, wherein the cable comprises a linear cable unit extended in parallel to the shaft core line, one end of the linear cable unit is connected to the outer pipe and another end of the linear cable unit is fastened to the linkage member to move with the linkage member.

10. The lifting device with the cable management component according to claim 9, wherein the linkage member comprises a hollow inner pipe and a screw nut, the screw nut is fastened to the hollow inner pipe and mutually screw-fitted with the screw rod to operate, the linear cable unit is fastened to the hollow inner pipe and moves with the hollow inner pipe, the spiral coiled cable unit and the positioning shaft are disposed in the hollow inner pipe, a latch member is disposed on a top inner wall of the outer pipe, the cable comprises a positioning segment latched to the latch member, the spiral coiled cable unit and the linear cable unit are extended from two ends of the positioning segment, and the latch member comprises a roller.

11. The lifting device with the cable management component according to claim 10, further comprising: a stopping seat, disposed between the motor and the hollow inner pipe to stop the hollow inner pipe, the stopping seat comprising a through hole, and one end of the spiral coiled cable unit away from the positioning segment passing through the through hole.

* * * * *